(12) United States Patent
Mastropasqua et al.

(10) Patent No.: US 10,279,984 B2
(45) Date of Patent: May 7, 2019

(54) CARTRIDGE AND ASSEMBLY FOR OBTAINING A BEVERAGE

(71) Applicant: ILLYCAFFE S.P.A, Trieste (IT)

(72) Inventors: Luca Mastropasqua, Trieste (IT);
Angelo Dori, Düsseldorf (DE); Stefano Santagiuliana, Caldogno (IT);
Giuseppe Cutuli, Trieste (IT); Gaia Brollo, Trieste (IT); Furio Suggi Liverani, Trieste (IT); Gianluca Giamba, Trieste (IT)

(73) Assignee: ILLYCAFFE' S.P.A., Trieste (IT)

( * ) Notice: Subject to any disclaimer, the term of this patent is extended or adjusted under 35 U.S.C. 154(b) by 348 days.

(21) Appl. No.: 14/376,648

(22) PCT Filed: Feb. 18, 2013

(86) PCT No.: PCT/EP2013/053158
§ 371 (c)(1),
(2) Date: Aug. 5, 2014

(87) PCT Pub. No.: WO2013/124234
PCT Pub. Date: Aug. 29, 2013

(65) Prior Publication Data
US 2014/0373725 A1    Dec. 25, 2014

(30) Foreign Application Priority Data

Feb. 20, 2012    (IT) .............................. MI2012A0247

(51) Int. Cl.
*B65D 85/804*    (2006.01)
*A47J 31/40*    (2006.01)
(Continued)

(52) U.S. Cl.
CPC ........ *B65D 85/8043* (2013.01); *A47J 31/407* (2013.01); *B65D 1/0261* (2013.01); *B65D 65/466* (2013.01); *B65D 77/30* (2013.01)

(58) Field of Classification Search
CPC ............. B65D 85/8043; B65D 85/8046; A47J 31/407; A47J 31/405
(Continued)

(56) References Cited

U.S. PATENT DOCUMENTS 1,580,143 A * 4/1926 Bogin ..................... C07C 67/40
                                                560/239
5,325,765 A * 7/1994 Sylvan ................ A47J 31/0673
                                                426/433
(Continued)

FOREIGN PATENT DOCUMENTS

EP    1555218 A1    7/2005
EP    1580144 A1    9/2005
(Continued)

OTHER PUBLICATIONS

International Search Report for corresponding application PCT/EP2013/053158 filed Feb. 18, 2013; dated May 10, 2013.
(Continued)

*Primary Examiner* — Ibrahime A Abraham
*Assistant Examiner* — Spencer H Kirkwood
(74) *Attorney, Agent, or Firm* — Scully, Scott, Murphy & Presser, P.C.

(57) ABSTRACT

A cartridge for obtaining a beverage by injecting into the cartridge a pressurized fluid, comprising a box-like body, which accommodates a substance from which it is possible to extract the beverage, and which accommodates on its inside an insert which separates the substance from a bottom wall of the box-like body, forming an interspace. The insert comprises an orifice for the passage of the beverage toward (Continued)

the interspace, whereas the bottom wall comprises a region which can be pierced to obtain an opening for the outflow of the beverage. In the interspace there is a basin which is arranged laterally with respect to the pierceable region in order to accumulate the beverage received directly from the orifice and make it flow out of the opening by overflowing.

15 Claims, 6 Drawing Sheets

(51) Int. Cl.
  *B65D 1/02* (2006.01)
  *B65D 77/30* (2006.01)
  *B65D 65/46* (2006.01)
(58) Field of Classification Search
  USPC .......................................................... 99/295
  See application file for complete search history.

(56) References Cited

U.S. PATENT DOCUMENTS

| | | |
|---|---|---|
| 7,681,492 B2 | 3/2010 | Suggi Liverani |
| 7,815,953 B2* | 10/2010 | Mastropasqua .... B65D 85/8043 426/433 |
| 8,844,428 B2 | 9/2014 | Kollep |
| 2008/0257165 A1* | 10/2008 | Bolzicco ............ B65D 85/8043 99/295 |
| 2013/0313766 A1 | 11/2013 | Bussit |

FOREIGN PATENT DOCUMENTS

| | | | |
|---|---|---|---|
| EP | 1674007 A1 | 6/2006 | |
| EP | 1580143 A1 * | 7/2007 | ......... B65D 85/8043 |
| EP | 1982933 A1 | 10/2008 | |
| EP | 2177460 A1 | 4/2010 | |
| WO | 02081337 A1 | 10/2002 | |
| WO | 2008125256 A1 | 10/2008 | |

OTHER PUBLICATIONS

Written Opinion for corresponding application PCT/EP2013/053158 filed Feb. 18, 2013; dated May 10, 2013.
Chinese Office Action for corresponding application 201380010310.5, Report dated Jul. 29, 2015.

* cited by examiner

CARTRIDGE AND ASSEMBLY FOR OBTAINING A BEVERAGE

CROSS REFERENCE TO RELATED APPLICATIONS

This application is the U.S. National Stage of International Patent Application Number PCT/EP2013/053158 filed on 18 Feb. 2013 which claimed priority to Italian Patent Application Number MI2012A000247 filed on 20 Feb. 2012, both of which said applications are herein incorporated by reference in their entirety.

TECHNICAL FIELD

The present invention relates to a cartridge for obtaining a beverage by injecting into the cartridge a pressurized fluid, particularly for obtaining espresso coffee starting from a dose of roasted and ground coffee contained in the cartridge.

BACKGROUND

In current pre-portioned systems for preparing beverages, such as for example systems for extracting espresso coffee starting from disposable cartridges, the substances from which the beverage is to be extracted are contained in hermetic cartridges made mainly of injection-molded or thermoformed plastic material or of metallic material such as aluminum.

It is known that these cartridges must be pierced at the bottom when the beverage is extracted, in order to allow the outflow thereof toward the outside, and typically the solutions for performing this piercing process are various. External piercing elements arranged on the machine are known, for example from European Patent Application EP1674007, or solutions that utilize the internal hydraulic pressure of the cartridge to create an outflow path for the beverage are known and described for example in European Patent Applications EP1555218 and EP2177460 or in PCT Application WO02/081337.

Other solutions instead do not provide for opening the cartridge at the time of use, but the cartridge is provided, already at the outset, with openings for the passage of the extracted beverage toward the outside. The latter solutions are not free from drawbacks, among which the fact must be noted that these known cartridges, obtained typically by injection molding, do not ensure such protection to the substance that they contain as to allow its preservation for a period suitable for the distribution and consumption cycles of the product. Further external packaging with barrier properties against external agents, such as for example humidity and oxygen, is therefore required in order to ensure the long-term preservation of the substance.

Moreover, the production of these cartridges requires the use of an excessive amount of plastic that consequently has a high environmental impact. Moreover, the particular stiffness of the cartridge does not allow separation between the plastic and the substance contained therein for sorted waste disposal.

A solution is known from European Patent EP1580144B1 in which the hermetically closed cartridge is obtained by sealing thermoformed components and contains inside it a fixed piercing element, which is activated by mechanical interference with the extraction chamber at the time of loading of the cartridge in the dispensing system and allows conveying the beverage directly into the cup, since no obstacles are interposed between the opening created by the internal piercing element, the extraction chamber and the cup.

This known cartridge solves part of the drawbacks of the background art, such as for example the high environmental impact, but has in some cases a less than optimum conveyance of the beverage and, in the particular case in which the beverage to be obtained is espresso coffee, does not make it possible to obtain a layer of crema that is abundant and persistent over time.

BRIEF SUMMARY

The aim of the present invention is to solve the drawbacks described above, devising a cartridge for obtaining a beverage by injecting in the cartridge a pressurized fluid that allows a tidy conveyance of the beverage directly into the cup.

Within the scope of this aim, a cartridge is provided particularly for obtaining espresso coffee in which the beverage is characterized by a layer of crema that is abundant and persistent over time, obtaining at the same time a cartridge of reduced axial size with respect to similar cartridges of the known type provided with means for obtaining crema.

A cartridge is further provided that is fully hermetic and does not need secondary packaging having barrier properties against external agents such as for example humidity and oxygen.

Moreover, a cartridge is obtained with a reduced quantity of plastic without altering the airtightness characteristics.

Still further, a cartridge is herein provided that is highly reliable, relatively easy to provide and has competitive costs.

More particularly, a cartridge is provided for obtaining a beverage by injecting into the cartridge a pressurized fluid, comprising a box-like body which accommodates a substance from which it is possible to extract a beverage by means of said injection of pressurized fluid, said box-like body furthermore comprising on its inside an insert which separates said substance from a bottom wall of said box-like body, so as to form a space between said insert and said bottom wall, said insert comprising an orifice for the passage of the beverage toward said space, said bottom wall comprising a region which can be pierced to obtain an opening for the outflow of the beverage, characterized in that it comprises, in said space, a basin which is arranged laterally with respect to said pierceable region, said basin being adapted to accumulate the beverage received directly from said orifice and to make it flow out of said opening by overflowing.

BRIEF DESCRIPTION OF THE DRAWINGS

Further characteristics and advantages of the invention will become more apparent from the description of a preferred but not exclusive embodiment of the cartridge according to the invention, illustrated by way of non-limiting example in the accompanying drawings, wherein.

DETAILED DESCRIPTION

Figure 1:
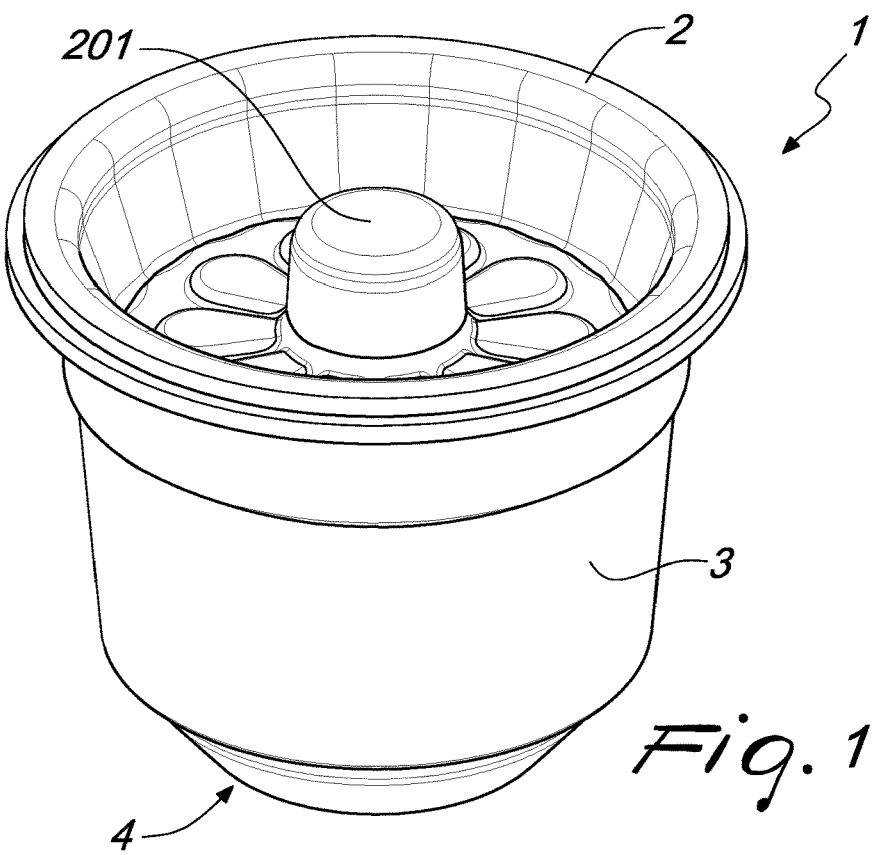
FIG. 1 is a perspective view of the cartridge.

With reference to the cited figures, a cartridge according to the invention, generally designated by the reference numeral 1, comprises a box-like body, for example with rotational symmetry, that may be constituted by a cup 3 closed hermetically by a lid 2.

Both the cup 3 and the lid 2 are obtained preferably by thermoforming starting from respective films and/or sheets and/or panels made of thermoplastic material, optionally provided as multilayer elements. These films and/or sheets and/or panels can be made, for example, of polypropylene, polystyrene, polyamide, biodegradable polyesters, biodegradable starch-based materials, bio-based thermoplastics, ethylene vinyl alcohol (EVOH) or high-density polyethylene (HDPE).

With thermoforming and the possible materials listed above it is possible to protect the substance contained in the cartridge 1 without the aid of secondary packaging with barrier properties against external agents such as for example humidity and oxygen, reducing at the same time the quantity of plastic used to provide it.

The lid 2 can be shaped so as to have an inlet spout 201, preferably closed by the same material as the lid 2 and pierceable for the injection of the pressurized fluid, for example hot water, suitable for obtaining a beverage. Needles suitable for piercing of spouts of this type and for injecting a pressurized fluid are per se known, for example from European Patent Application EP1580144, the content of which is incorporated herein by reference.

The lid 2 comprises furthermore an edge 202 suitable to be fixed on a corresponding flanged edge 304 that forms the mouth of the cup 3. The fixing of the edge 202 on the flanged edge 304, which can be obtained with techniques of a known type, such as for example ultrasound welding, is airtight, so as to close hermetically the internal volume of the box-like body.

Finally, the lid 2 comprises at least one recess 203 suitable to define a cavity 204 between the lid 2 and an optional underlying filter 301, in order to allow the distribution of the pressurized fluid injected into the spout 201 over the entire upper surface of a dose of substance 302 accommodated in the cup 3 from which it is possible to extract the beverage by means of said fluid. The substance 302 is, preferably, roasted and ground coffee, used typically in machines for making espresso coffee.

Downstream of the filter 301 and of the substance 302, in the direction of injection of the pressurized fluid, there is a further filter 303 suitable for retaining the solid residues of the substance 302. The filter 303, which is made for example of rigid plastic material, can have a symmetrical shape with respect to a central plane thereof and can be provided with equally symmetrical holes 304, for example shaped like a double frustum, like the filter known from European Patent Application EP1982933, the contents of which are incorporated herein by reference.

The cup 3 has, moreover, a bottom wall 4 that is preferably shaped like two superimposed conical frustums. In particular, the lower end of the bottom wall 4 has a substantially flat pierceable region 401 that is connected, by means of a first substantially conical surface 402, to an annular step 403, which is in turn connected by means of a second substantially conical surface 404 to a resting ring 405, from which the substantially cylindrical or frustoconical lateral wall of the cup 3, which terminates in the edge 304, extends.

On the bottom of the cup 3, downstream of the substance 302 and of the filter 303 with respect to the direction of the injected fluid, there is an insert 5, which can be made of injection-molded plastic such as for example polypropylene and is preferably fixed on a surface that is inside the cartridge; for example, the insert is sealed along its peripheral portion on the face of the resting ring 405 that is within the cup 3.

Figure 2:
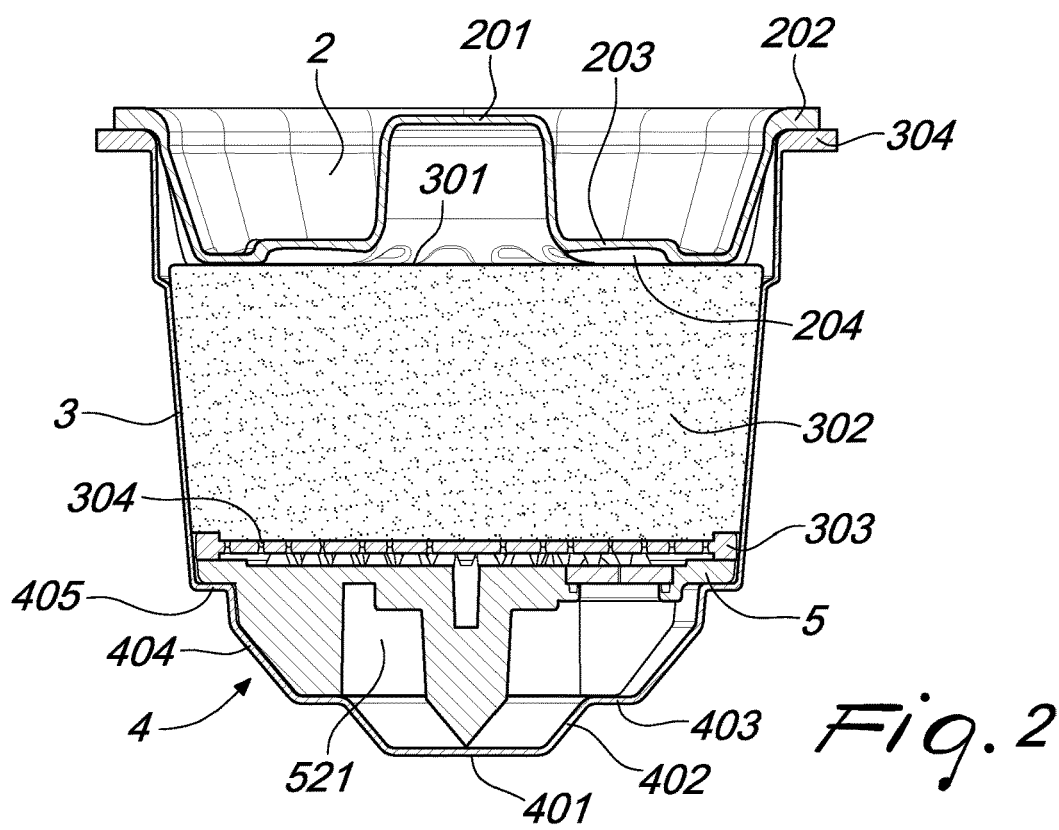
FIG. 2 is an axial sectional view of the cartridge of FIG. 1.
Figure 3:
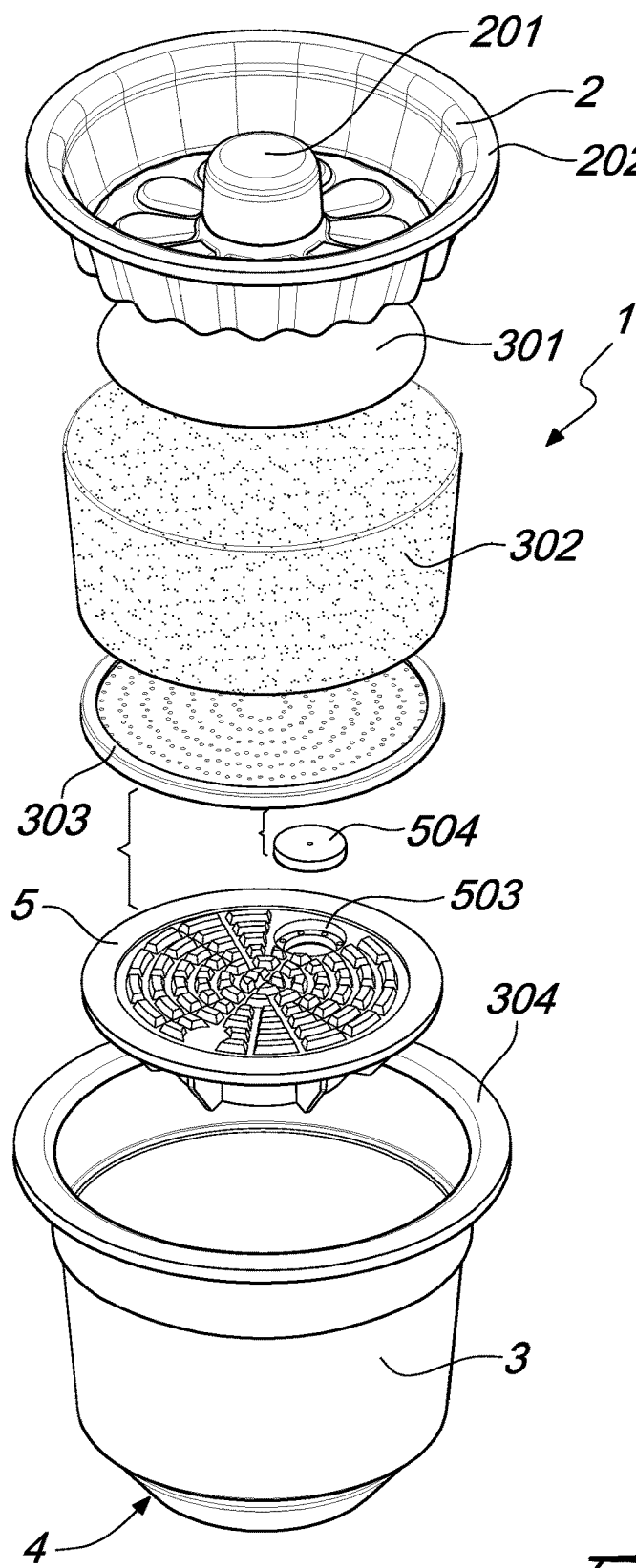
FIG. 3 is an exploded view of the cartridge of FIG. 1.
Figure 4:
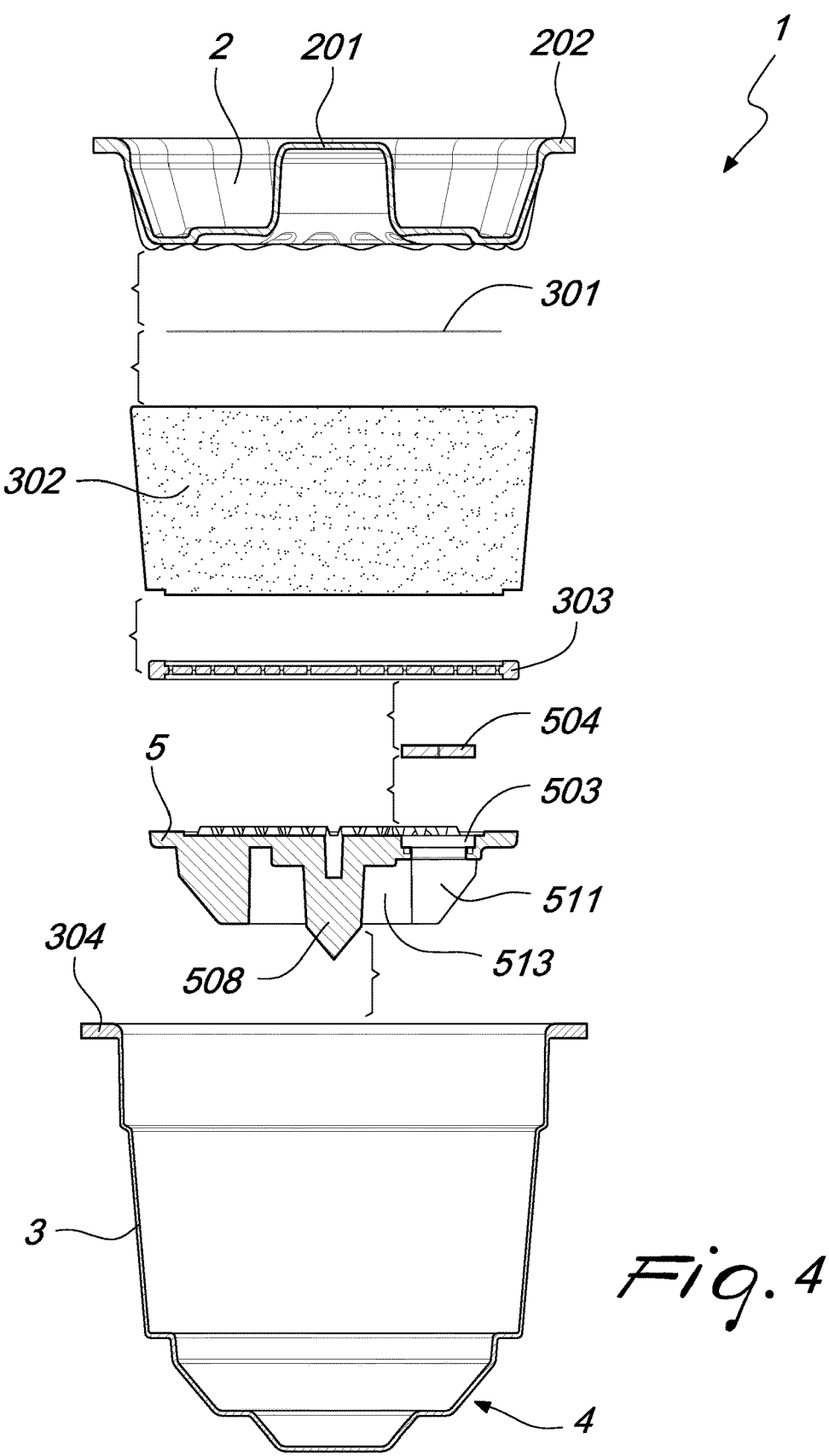
FIG. 4 is an axial sectional view of the exploded view of FIG. 3.
Figure 5:
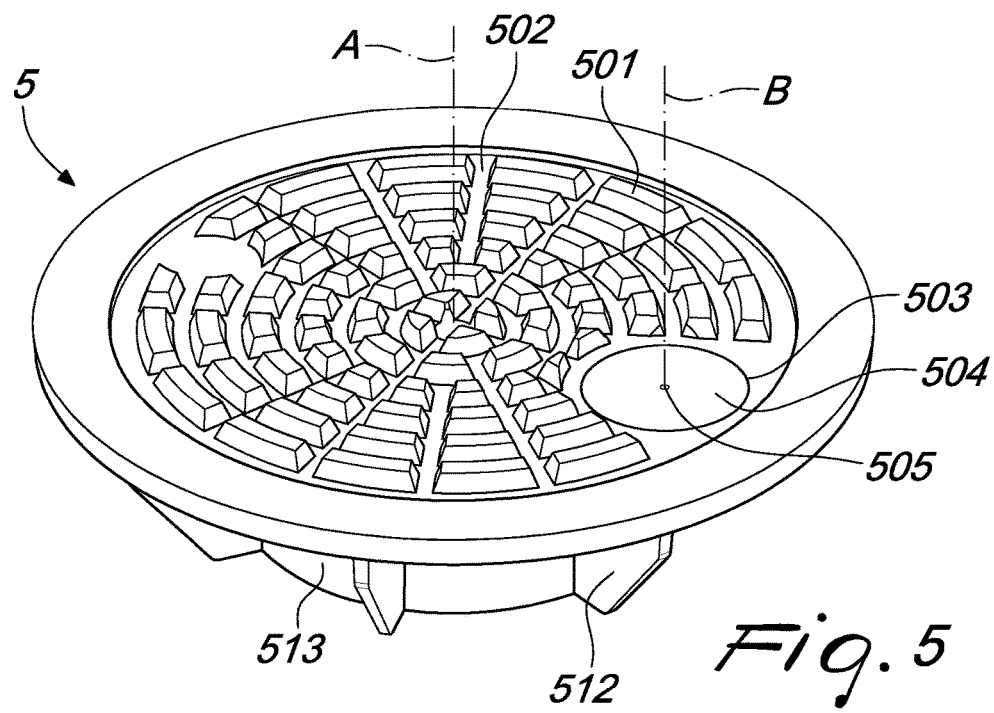
FIG. 5 is an elevated perspective view of the insert used in the cartridge of FIG. 1.
Figure 6:
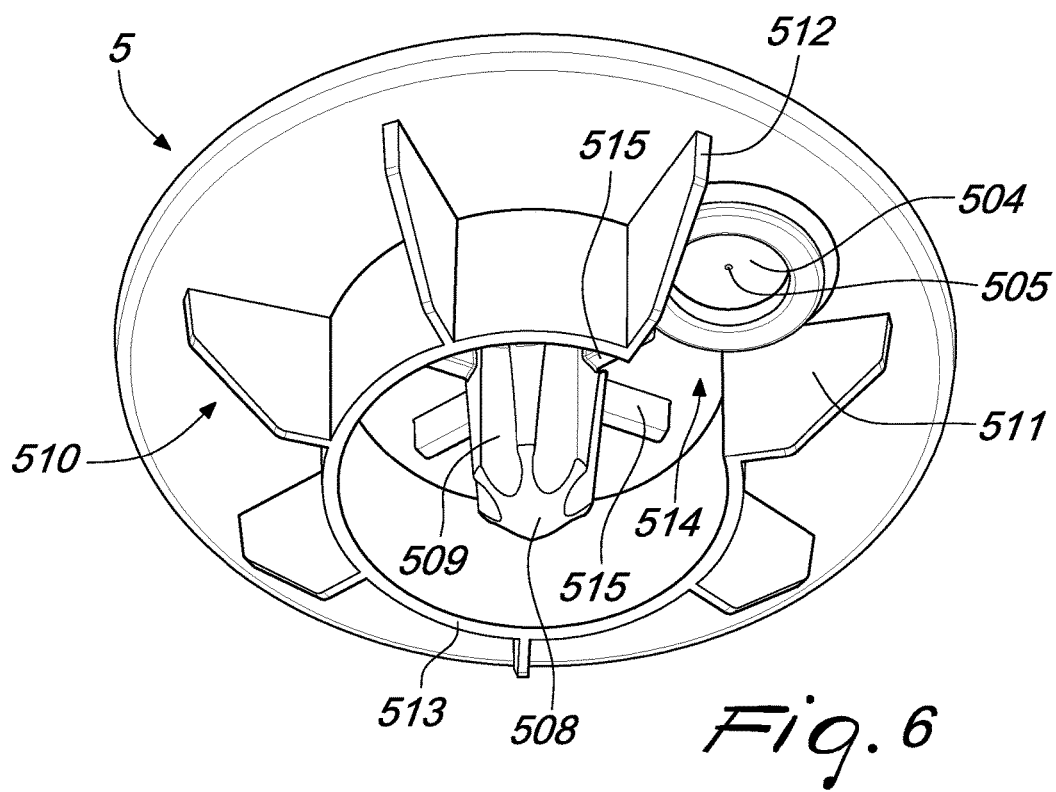
FIG. 6 is a bottom perspective view of the insert of FIG. 5.
Figure 7:
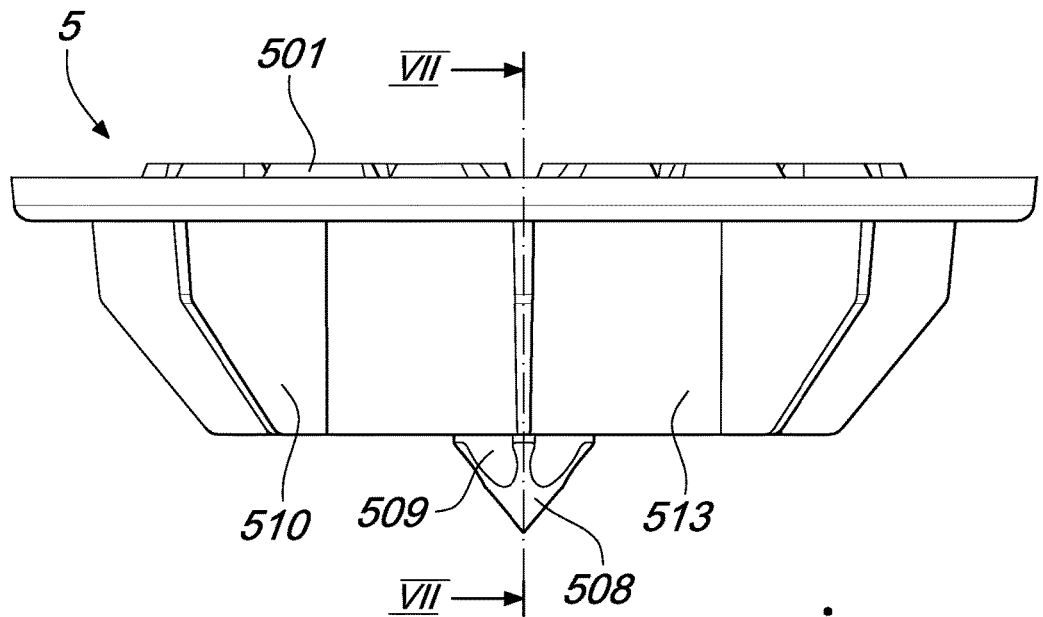
FIG. 7 is a side view of the insert of FIG. 5.
Figure 8:
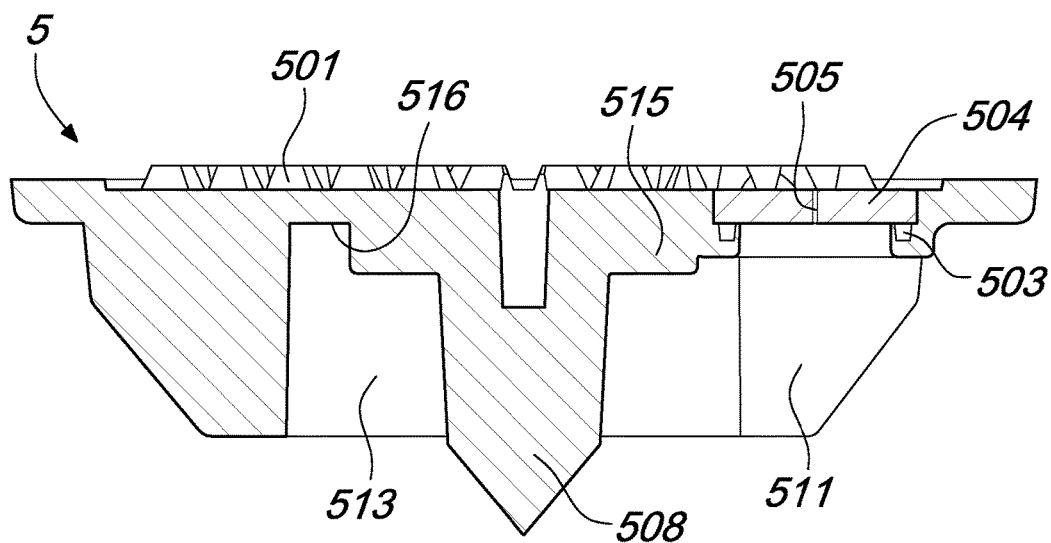
FIG. 8 is a sectional view of the insert of FIG. 7, along the plane VII-VII.

The insert 5, having a preferably circular perimeter, separates the substance 302 from the bottom wall 4 so as to form an interspace 521 between the insert 5 and the bottom wall 4. This bottom wall 4 is deformable mechanically toward the insert 5 from an inactive configuration, such as the one of FIG. 2, to a deformed configuration, such as the one of FIG. 9. This deformation can be obtained by means of a counterpressure element 600, which is preferably passive. The counterpressure element 600 is arranged on the base of an extraction chamber in which the cartridge 1 is accommodated and has a relief contour 601 and a passage 602 for the beverage that flows out of the cartridge 1 such that the beverage cannot come into contact with the walls of the counterpressure element 600 along said passage 602. This avoids contamination between successive preparations of beverage that would cause qualitative deterioration of said preparations.

On the upper face of the insert 5 there is a plurality of raised portions 501 suitable to define a densely packed set of channels 502 together with the filter 303 in order to convey the extracted beverage toward the interspace between the insert 5 and the bottom wall 4.

On its lower face, the insert 5 may have a punch 508, preferably in a central position, which extends along an axis A toward the bottom wall 4 and is adapted to pierce it due to the deformation of the bottom wall 4 obtained, for example, with the counterpressure element 600, so as to create on the bottom wall 4 an opening 410 for the outflow of the beverage at the pierceable region 401.

The punch 508 may have a conical tip and a plurality of axial grooves 509 along its lateral surface, which are adapted to convey the beverage extracted from the substance 302 toward the outside of the cartridge 1. The grooves 509 may have a substantially cylindrical surface, with an axis that is substantially parallel to the axis A of the punch 508.

The insert 5 comprises, moreover, an orifice 505 for the passage of the beverage through the insert 5 toward the interspace 521. Said orifice 505 extends along an axis B that is substantially parallel but axially offset with respect to the axis A of the punch 508.

Advantageously, there is only one orifice 505, so that the extracted beverage is conveyed through the channels 502 toward a single point, and said orifice 505 is preferably provided as an expandable orifice. For example, the orifice 505 can be obtained by providing a through hole or a weakened region with predetermined fracture points on a septum 504 made of elastic material, preferably a thermoplastic elastomer (TPE) such as a styrene block copolymer (SEBS or SBS). In this manner, the orifice 505 is normally closed and opens when the hydraulic pressure inside the cartridge 1 exceeds a certain threshold.

The septum 504 thus formed is fixed in a respective open seat 503 formed in the insert 5, for example by means of co-molding techniques.

On the lower surface of the insert 5, for example around the punch 508, there may be protrusions 515 that protrude toward the bottom wall 4 and provide an abutment for the torn flaps 411 of the pierceable region 401 when the bottom wall 4 is in the deformed configuration. In this manner, an opening is maintained between said flaps 411 and the lower surface 516 of the insert 5, in order to allow the passage of the extracted beverage toward the outside of the cartridge 1.

In the illustrated embodiment, the insert 5 comprises a spacer, in the shape of a set of fins 510, which protrudes from the lower surface of the insert 5 into the interspace 521 and is adapted to define and maintain said interspace even in the deformed configuration of the bottom wall 4 of the cartridge 1.

The fins of the set of fins 510 can extend in a radial direction with respect to the punch 508 and have a free edge that is substantially complementary to the shape of the bottom wall 4, so that the second substantially conical surface 404 and the annular step 403 can abut on said edge.

Figure 9:
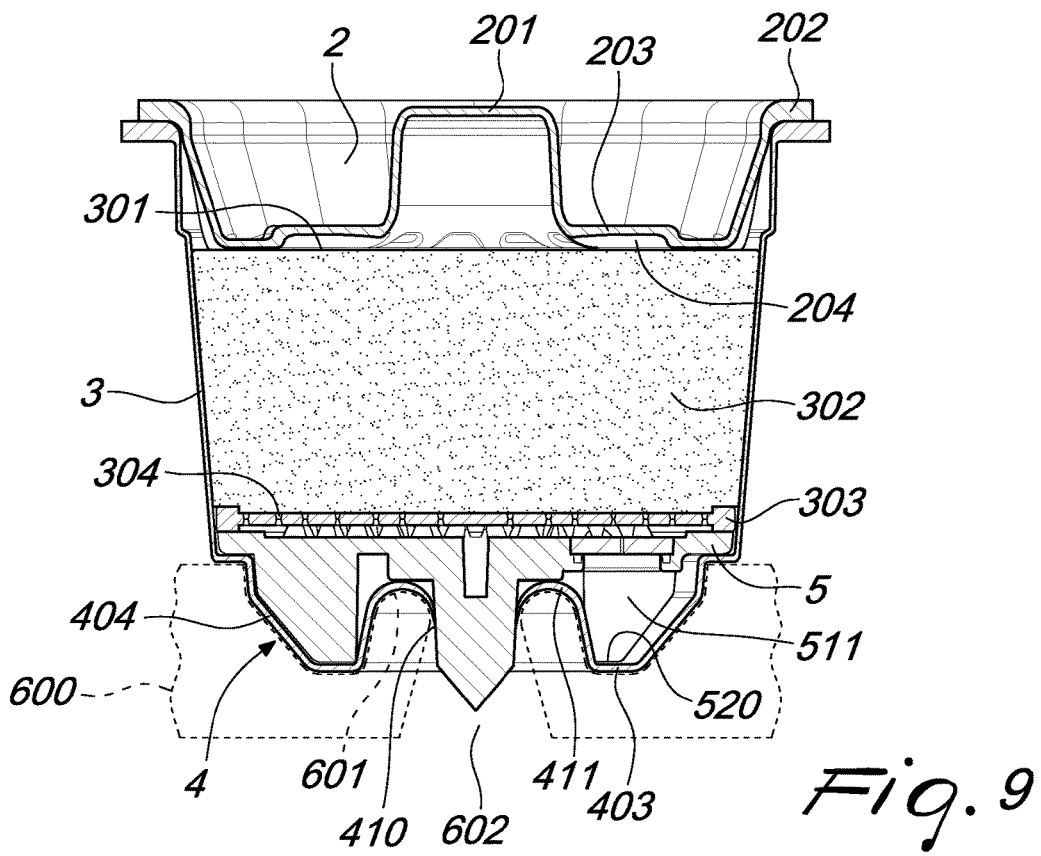
FIG. 9 is an axial sectional view of the cartridge of FIG. 1 with the bottom wall in the deformed configuration.
Figure 10:
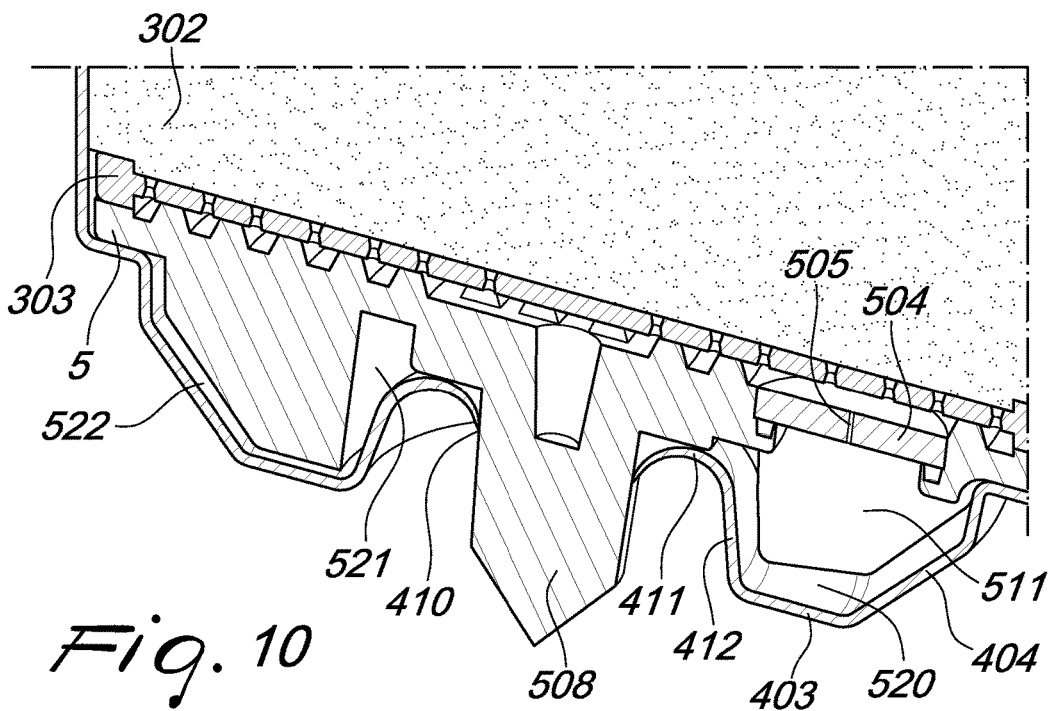
FIG. 10 is a perspective view of the cross-section in FIG. 9.

Around the punch 508 there may be also a substantially cylindrical wall 513, which is coaxial with the punch 508 and on the free edge of which the bottom wall 4 can abut when it is at least in the deformed configuration, as shown in FIGS. 9 and 10. In the illustrated example, the fins of the set of fins 510 protrude radially from the outer lateral surface of the substantially cylindrical wall 513 and the axial extension of the fins and of the wall 513 is the same, so that the annular step 403 of the bottom wall 4 of the cartridge 1 can abut uniformly on the free edges of the fins and of the wall 513. The punch 508, instead, can have a greater axial extension than the substantially cylindrical wall 513 and/or the fins.

In the deformed configuration of the bottom wall 4, the insert 5 also forms with said bottom wall 4 a basin 520 that is displaced laterally with respect to the opening 410 for the outflow of the beverage and is adapted to accumulate the beverage received directly from the orifice 505 and make it flow out from the opening 410 by means of a forced outflow that causes the overflow of the beverage from the basin 520.

The basin 520 constitutes a stilling basin for the beverage, which flows out at high speed from the orifice 505, and is useful to slow down the flow considerably and avoid consequently that the beverage is sprayed out of the cartridge 1 in an uncontrolled manner that is detrimental to the quality of the beverage in the external cup or glass in which it is collected during dispensing. Moreover, the interference effect between the accelerated flow of beverage that flows out at high speed from the orifice 505 and the bottom wall 4 of the cartridge 1 allows improving the emulsion of the lipid fraction in the beverage. The basin 520 is advantageously defined in a limited sector of the interspace 521, which the orifice 505 faces and which is delimited at the bottom by a portion of the annular step 403 and laterally by two fins 511 and 512 of the set of fins 510, by a portion of the second substantially conical surface 404 comprised between said fins 511 and 512 and by an overflow barrier 412 and is defined by a portion of the flaps 411 torn following the piercing of the pierceable region 401 by the punch 508.

In this manner, whereas the fins of the set of fins 510 define in pairs substantially sealed chambers, through which the extracted beverage does not pass, the fins 511 and 512 between which the orifice 505 faces define the basin 520 in which the beverage is accumulated substantially without leakages toward the chambers defined by the other fins.

Conveniently, the substantially cylindrical wall 513 comprises a recess 514 which is directed toward the basin 520 and through which the beverage accumulated in the basin 520 flows out by overflow. The overflow level can be defined by a lower portion of the wall 513 if the recess 514 is provided only in an upper portion of the wall (this case is not shown in the figures).

As an alternative, as shown in FIGS. 9 and 10, the recess 514 extends along the entire height of the substantially cylindrical wall 513, which is thus completely open toward the basin 520, with the two fins 511 and 512 connected to the substantially cylindrical wall 513 on opposite sides with respect to the recess 514. In this case, the saturation of the basin 520, by means of the accumulated beverage that flows out from the orifice 505, conveys the beverage behind the overflow wall 412 toward the opening 410.

In a variation of the invention, not shown, the stilling basin can be obtained, by means of molding techniques, directly and completely on the insert 5, as a cup that is coaxial with the orifice 505. This variation, however, entails a greater use of plastic material in order to obtain at least the bottom of the basin and the overflow barrier.

The cartridge 1 according to the invention can be used in combination with a suitable extraction assembly, for example of a machine for preparing espresso coffee. The extraction assembly, not shown in the figures, comprises an extraction chamber and an injector of a fluid that is connected thereto, both known per se.

The extraction chamber can be defined entirely in the machine for preparing the beverage or it can be defined at least partially on a removable support of the cartridge 1, to be attached to the beverage extraction machine that contains the injector of the pressurized fluid, for example a machine for the extraction of espresso coffee. This removable support can be a filter holder similar to the one known from European Patent Application EP1580144.

On the base of the extraction chamber there is a passage 602 for the extracted beverage that faces directly the cup or glass into which one wishes to dispense the beverage and there is also a counterpressure element 600, which is suitable to deform the bottom wall 4 of the cartridge 1 after its placement in the extraction chamber. This counterpressure element is preferably shaped substantially complementary to the lower part of the insert 5 of the cartridge 1. In particular, the counterpressure element 600 may have a relief contour 601 with an edge that may be beveled or not sharp, which is coaxial to the punch 508 of the cartridge 1 and to the outflow passage 602. The relief contour 601 of the counterpressure element 600 has, preferably, a diametrical extension that is suitable to make it penetrate between the substantially cylindrical wall 513 and the punch 508 of the insert 5 following a mechanical interference obtained by pressing the cartridge 1 against the counterpressure element 600 or vice versa, so as to deform only the portion of the bottom wall 4 of the cartridge 1 left free by the set of fins 510, i.e., the frustoconical portion defined by the pierceable region 401 and by the first substantially conical surface 402.

The operation of the invention is evident from what has been described above in relation to the preferred embodiment. In particular, in order to obtain the opening 410 for the outflow of the beverage, the counterpressure element 600 of the extraction chamber is brought into contact with the bottom wall 4 of the cartridge, for example by resting the cartridge onto a removable support that has on its bottom said counterpressure element 600 and can be attached to the corresponding machine for preparing the beverage with an approach movement that has an axial component and can be obtained for example with a traditional bayonet-type coupling.

As an alternative, the cartridge 1 may be inserted into an extraction chamber that is integrated in the machine for preparing the beverage and is provided on the inside with the counterpressure element 600. In this case, the counterpressure element 600, or a surface of the extraction chamber that is opposite to it with respect to the cartridge 1, can move toward the cartridge 1 in order to perform the mechanical deformation of the bottom wall 4 described above.

By exerting, therefore, a mutual force between the counterpressure element 600 and the cartridge 1, the tension on the bottom wall 4 and its interference with the conical tip of the punch 508 both increase, causing consequently the tearing of the pierceable region 401 and creating the opening 410 for the outflow of the beverage, as shown in FIG. 9.

The torn flaps 411 of the bottom wall 4 produced by the piercing are preferably pushed by the relief contour 601 to the protrusions 515, thus forming the overflow barrier 412 that closes the basin 520, forming a sort of stilling basin for the beverage.

At the same time, upon the deformation of the bottom wall 4 by the counterpressure element, the spout 201 of the lid 2 is penetrated by the injector of the pressurized fluid. Obviously, the piercing of the spout 201 can also occur before or after the deformation of the bottom wall 4 by the counterpressure element 600.

Then the injection of the pressurized fluid in the cartridge 1 is activated for extraction of the beverage starting from the substance 502.

If the beverage is espresso coffee and the substance 302 is roasted and ground coffee, the input fluid is hot water, for example at a temperature comprised between 90° C. and 99° C. The injection of the hot water, in this case, can be performed at a pressure that is initially low, for example 2 bars, which is insufficient to open the orifice 505 of the elastic septum 504, and said injection can be interrupted in order to allow imbibition of the dose of roasted and ground coffee for a certain time interval, for example for approximately one second. Only after these steps of pre-infusion and imbibition can the injection of hot water be reactivated at a higher pressure, such as for example 9 bars.

As the pressure inside the cartridge increases, and once a certain threshold has been exceeded, the orifice 505, which is normally closed, is opened, allowing the extracted beverage to flow out at high speed and accumulate in the basin 520.

When the level of the beverage in the basin 520 exceeds the overflow point of the overflow barrier 412, the beverage starts to overflow toward the punch 508 and to flow out from the opening 410 under the thrust of the beverage that continues to flow out from the orifice 505, and is thus conveyed in an orderly manner directly into an external cup or glass. Advantageously, thanks to the axial grooves 509, the beverage is conveyed toward the conical tip of the punch 508, which thus guides the beverage in an orderly manner. Moreover, again thanks to the axial grooves 509, the torn flaps 411 of the bottom wall 4 of the cartridge do not block the outflow of the beverage around the punch toward the outside.

When the injection of the pressurized fluid in the cartridge stops, the basin 520 remains full and the beverage, even if it is beyond the overflow limit, does not flow out from the cartridge 1.

In practice it has been found that the cartridge according to the invention fully achieves the intended aim, since it allows the orderly delivery of the beverage directly into a cup, even with a very limited number of elements.

The spacing of the stilling basin from the region of the outflow of the beverage from the cartridge affects positively the outflow fluid dynamics of the beverage.

The stilling basin is even obtained directly on the bottom of the cartridge itself, without requiring additional components.

The invention makes it possible, moreover, to reduce the vertical dimension of the cartridge by virtue of the side-by-side arrangement of the stilling basin and of the exit point of the beverage from the cartridge.

Moreover, the fact that the stilling basin of the beverage is arranged directly below an expandable orifice obtained in an elastic septum, without the interposition of obstacles, allows the septum to swell freely under the effect of the hydraulic pressure of the beverage and allows an outflow of the beverage from the orifice of the septum even in case of non-optimum centering thereof.

Moreover, the possibility of obtaining at least the box-like body of the cartridge by thermoforming of films and/or sheets and/or panels made of thermoplastic material, optionally provided as a barrier multilayer, allows reducing the amount of plastic material required to provide the cartridge, ensuring at the same time optimum airtightness.

Advantageously, the axial grooves provided on the outer surface of the punch with conical tip allow obtaining a through cross-section of the liquid that is suitable for the delivered flows, do not compromise the mechanical strength of the tip in the piercing step and convey the outward flow from the grooves toward the final conical surface of the piercing element that guides the beverage in an orderly manner toward the cup.

The almost-closed C-shaped cross-section of said grooves is, moreover, functional to prevent the partial obstruction of said grooves due to the action of the torn flaps of the bottom of the cartridge caused by piercing.

Although the cartridge according to the invention has been conceived particularly for the preparation of espresso coffee starting from a dose of roasted and ground coffee, it might however be used, more generally, for the preparation of hot or cold beverages starting from edible substances in the form of particulate or leaves or liquid concentrates.

The cartridge thus conceived is susceptible of numerous modifications and variations, all of which are within the scope of the appended claims; all the details may furthermore be replaced with other technically equivalent elements.

In practice, the materials used, as well as the dimensions, may be any according to the requirements and the state of the art.

The invention claimed is:

1. A cartridge for obtaining a beverage by injecting into the cartridge a pressurized fluid, comprising a box-like body which accommodates a substance from which it is possible to extract a beverage by means of said injection of pressurized fluid, said box-like body furthermore comprising on its inside an insert which separates said substance from a bottom wall of said box-like body, so as to form an interspace between said insert and said bottom wall, said insert comprising an orifice for the passage of the beverage toward said interspace, said bottom wall comprising a region which can be pierced to obtain an opening for the outflow of the beverage, and further comprising, in said interspace, a basin which is arranged laterally with respect to said pierceable region, said basin being adapted to accumulate the beverage received directly from said orifice and to make it flow out of said opening by overflowing, wherein said basin comprises an overflow barrier, the overflow barrier and is formed by a portion of the bottom wall in the deformed configuration of said bottom wall.

2. The cartridge according to claim 1, wherein said bottom wall is deformable mechanically toward said insert from an inactive configuration to a deformed configuration, said insert comprising at least one punch which is directed toward said bottom wall and is adapted to pierce it due to said deformation, so as to create said opening for the outflow of the beverage at said pierceable region, said orifice being axially offset with respect to said punch.

3. The cartridge according to claim 1, wherein said insert forms, together with said bottom wall in the deformed configuration, said basin in a laterally limited sector of said interspace, said orifice facing said sector.

4. The cartridge according to claim 2, wherein said insert comprises a set of fins, which protrude into said interspace, so that at least two fins of said set of fins between which an axis of said orifice passes form said basin together with a portion of said bottom wall in the deformed configuration.

5. The cartridge according to claim 4, wherein said at least two fins that protrude from said insert are directed substantially radially with respect to said punch.

6. The cartridge according to claim 2, wherein said insert comprises a substantially cylindrical wall which surrounds said punch and against the free edge of which said bottom wall abuts at least in the deformed configuration, said substantially cylindrical wall comprising a recess which is directed toward said basin and through which the beverage accumulated in said basin flows out due to said overflow.

7. The cartridge according to claim 6, wherein said substantially cylindrical wall is completely open toward said basin and said at least two fins are connected to said substantially cylindrical wall on opposite sides with respect to said recess.

8. The cartridge according to claim 1, wherein said opening for the outflow of the beverage is at a higher level than the bottom of said basin.

9. The cartridge according to claim 2, wherein said punch comprises axial grooves, preferably having a C-shaped cross-section, which are adapted to convey said beverage out of the cartridge through said outflow opening.

10. The cartridge according to claim 1, wherein said orifice can expand due to the pressure of the beverage.

11. The cartridge according to claim 1, wherein said boxlike body is made of thermoplastic material, for example polypropylene, polystyrene, polyamide, biodegradable polyesters, biodegradable starch-based materials, bio-based thermoplastics, ethylene vinyl alcohol (EVOH) or high-density polyethylene (HDPE), and is obtained by thermoforming.

12. An assembly for extracting a beverage by injecting a pressurized fluid in a cartridge starting from a substance enclosed in said cartridge, said assembly comprising an extraction chamber, wherein said extraction chamber accommodates the cartridge according to claim 1, and in that said extraction chamber comprises a counterpressure element, which is adapted to deform the bottom wall of said cartridge during its placement in said extraction chamber so that a punch inside the cartridge pierces said bottom wall of the cartridge.

13. The cartridge according to claim 2, wherein said interspace extends around a circumference of at least one punch.

14. The cartridge according to claim 4, wherein the set of fins protrude into the interspace a distance that is a majority of the height of the at least one punch.

15. The cartridge according to claim 6, wherein the substantially circular wall and an open seat form a circumference around the at least one punch.

* * * * *